United States Patent Office 3,517,090
Patented June 23, 1970

3,517,090
UNSATURATED PHOSPHONATES
Lester Friedman, Beachwood Village, Ohio, assignor to Weston Chemical Corporation, New York, N.Y., a corporation of New Jersey
No Drawing. Continuation-in-part of applications Ser. No. 145,749, Oct. 17, 1961, and Ser. No. 129,529, Aug. 7, 1961. Division of applications Ser. No. 371,079, May 28, 1964, now Patent No. 3,442,827; Ser. No. 371,122, May 28, 1964, now Patent No. 3,245,051; and Ser. No. 467,694, June 28, 1965, now Patent No. 3,359,348. This application Nov. 15, 1967, Ser. No. 683,134
Int. Cl. C07f 9/08
U.S. Cl. 260—953
5 Claims

ABSTRACT OF THE DISCLOSURE

Phosphonates having the formula

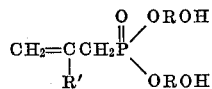

where R' is hydrogen or methyl and R is alkylene-oxy-alkylene or alkylene polyoxyalkylene are prepared by reacting allyl or methallyl chloride with a tris-diethylene glycol phosphite or a tris-dipropylene glycol phosphite. The phosphonates are useful in preparing polyesters and nonburning polyurethanes.

---

This application is a division of application Ser. No. 467,694, filed June 28, 1965, now Pat. 3,359,348, a division of application Ser. No. 371,122, filed May 28, 1964, now Pat. 3,245,051, a division of application Ser. No. 371,079, filed May 28, 1964, now Pat. 3,442,827, a continuation-in-part of application Ser. No. 145,749, filed Oct. 17, 1961, now Pat. 3,142,651 and it is a continuation-in-part of application Ser. No. 129,529, filed Aug. 7, 1961, now Pat. 3,081,331. The disclosure of the first three mentioned applications is identical.

The present invention relates to the preparation of polyurethanes, including foamed polyurethanes, from phosphite esters containing available hydroxyl groups, preferably secondary hydroxyl groups. It also includes the preparation of polyurethanes from the corresponding thiophosphate esters and phosphate esters.

It is an object of the present invention to prepare polyurethanes from phosphites having at least three free hydroxyl groups.

Another object is to prepare polyurethanes from thiophosphates having at least three free hydroxyl groups.

A further object is to prepare polyurethanes from phosphites having at least three free secondary hydroxyl groups.

An additional object is to prepare novel flame-resistant polyurethanes.

A further object is to prepare polyurethanes from hydroxy containing pentaerythritol phosphites.

Yet another object is to prepare improved formed polyurethanes.

A still further object is to prepare stabilized polyurethanes.

Still further objects and the entire scope of applicability of the present invention will become apparent from the detailed description given hereinafter; it should be understood, however, that the detailed description and specific examples, while indicating preferred embodiments of the invention are given by way of illustration only, since various changes and modifications within the spirit and scope of the invention will become apparent to those skilled in the art from this detailed description.

It has now been found that these objects can be attained by reacting certain hydroxyl containing phosphites and/or thiophosphates with an organic polyisocyanate to form polyurethane. Preferably, phosphites are employed so that the polyurethane produced has phosphite groupings therein.

The polyurethanes prepared according to the present invention are solids. They have good flame-proofing properties and in the foamed form are useful as linings for textiles, e.g., coats, suits and dresses, insulation in building construction, upholstery filling material, pillows, hair curlers, brushes, carpet underlays or backings, shock absorbent filling for packages, etc.

The unfoamed polyurethane products are useful wherever elastomeric polyurethanes can be employed with the advantage of improved flame and fire resistance. The elastomers in thread form can be employed in making girdles. The unfoamed polyurethanes are suitable for molding cups and other articles, and as protective coatings for steel, wood and glass.

The polyurethanes can be cured in conventional fashion, e.g., in an oven at 110° C.

As examples of organic polyisocyanates which can be employed to make the polyurethane there can be employed toluene-2,4-diisocyanate, toluene-2,6-diisocyanate, 4-methoxy-1,3-phenylene diisocyanate, diphenyl methane-4,4'-diisocyanate, 4-chloro-1,3-phenylene-diisocyanate, 4-isopropyl-1,3-phenylene-diisocyanate, 4-ethoxy-1,3-phenylene-diisocyanate, 2,4-diisocyanate-diphenylether, 3,3'-dimethyl-4,4'-diisocyanatodiphenyl methane, mesitylene diisocyanate, durylene diisocyanate, 4,4'-methylene-bis (phenylisocyanate), benzidine diisocyanate, o-nitrobenzidine diisocyanate, 4,4'-diisocyanatedibenzyl, 3,3'-bitolylene-4,4'-diisocyanate, 1,5-naphthalene diisocyanate, tetramethylene diisocyanate, hexamethylene diisocyanate, decamethylene diisocyanate, toluene-2,4,6-triisocyanate, tritolylmethane triisocyanate, and 2,4,4'-triisocyanate-diphenyl ether, the reaction product of toluene diisocyanate with tri-methylolpropane at an NCO/OH ratio of 2:1 (Mondur CB), the reaction product of toluene diisocyanate with 1,2,6-hexanetriol at an NCO/OH ratio of 2:1, the reaction product of toluene diisocyanate with the polyol phosphite at an NCO/OH ratio of 2:1, e.g., when the polyol phosphite is dipropylene glycol tetrol diphosphite or tris (pentaerythritol-polypropylene glycol ether) phosphite.

Alternatively, as the polyisocyanate there can be used prepolymers made by reacting one or more of the above polyisocyanates with a polyhydroxy compound such as a polyester having terminal hydroxyl groups, a polyhydric alcohol, glycerides, hydroxy containing glycerides, etc. The prepolymers should have terminal isocyanate groups. To insure this it is frequently desirable to employ an excess of 5% or more of the polyisocyanate in forming the prepolymer.

Unsaturated phosphonates can be formed by reacting an excess of allyl chloride, methallyl chloride, allyl bromide, or methallyl bromide with tris-diethylene glycol phosphite or tris dipropylene glycol phosphite. These compounds are useful in preparing urethanes having the uses enumerated supra.

EXAMPLE 1

One mole of tris diethylene glycol phosphite was refluxed with 6 moles of allyl chloride until there was no increase in P=O bond in the infrared analysis. Volatile material was stripped off first at atmospheric pressure up to 100° C. and then at 10 mm. and 150° C. to recover the bis diethylene glycol allylphosphonate, molecular weight 298, hydroxyl number 375, as a liquid.

EXAMPLE 2

The process of Example 1 was repeated replacing the tris diethylene glycol phosphite by one mole of tris dipropylene glycol phosphite to produce bis-dipropylene glycol allylphosphonate, molecular weight 312, and hydroxyl number 360, as a liquid.

EXAMPLE 3

The process of Example 1 was repeated replacing the allyl chloride by 6 moles of methallyl chloride to produce bis-diethylene glycol methallylphosphonate, molecular weight 354, hydroxyl number 316, as a liquid.

EXAMPLE 4

The process of Example 3 was repeated but the tris diethylene glycol phosphite was replaced by one mole of tris dipropylene glycol phosphite to produce bis-dipropylene glycol methallylphosphonate, a viscous liquid having a molecular weight of 368 and a hydroxyl number of 305.

The compounds prepared in Examples 1–4 have the formula

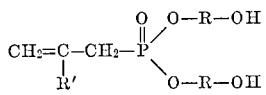

where R' is H or methyl and R is —CH$_2$CH$_2$OCH$_2$CH$_2$— or

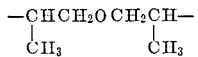

The diolalkene phosphonates thus produced can be polymerized, e.g., with free radical producing agents such as benzoyl peroxide, or reacted with di- or other polycarboxylic acids to give air-drying polyesters. Alternatively, they can be reacted with polyisocyanates, e.g., toluene diisocyanate, to give polyurethanes which can be further polymerized by virtue of the ethylenic double bond to give products useful as coatings, castings, etc. The products are either self-extinguishing or nonburning. The diolalkenephosphonates can be copolymerized with other materials having ethylenic unsaturation, e.g., acrylates such as methyl acrylate, butyl acrylate and methyl methacrylate, styrene, acrylonitrile, ethylene and propylene. They can also be used as cross-linking agents. Additionally, the polymers produced can have enhanced dyeing properties because of the polarity introduced.

What is claimed is:

1. A phosphonate having the formula

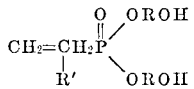

where R' is selected from the group consisting of hydrogen and methyl and R is the lower alkyleneoxy lower alkylene radical.

2. A phosphonate according to claim 1 which is bis diethylene glycol allyl phosphonate.

3. A phosphonate according to claim 1 which is bis dipropylene glycol allyl phosphonate.

4. A phosphonate according to claim 1 which is bis dipropylene glycol methallyl phosphonate.

5. A phosphonate according to claim 1 which is bis diethylene glycol methallyl phosphonate.

References Cited

UNITED STATES PATENTS 2,990,421   6/1961   Melton et al. _____ 260—953

CHARLES B. PARKER, Primary Examiner

RICHARD L. RAYMOND, Assistant Examiner

U.S. Cl. X.R.

260—77.5